United States Patent [19]
Nagafusa

[11] Patent Number: 5,684,933
[45] Date of Patent: Nov. 4, 1997

[54] METHOD AND APPARATUS FOR FORMING IMAGES USING A PRE AND POST SMOOTHING BIT THINNING DOWN PROCESS

[75] Inventor: Yoshiyuki Nagafusa, Watarai-gun, Japan

[73] Assignee: Kyocera Corporation, Kyoto, Japan

[21] Appl. No.: 682,185

[22] Filed: Jul. 17, 1996

[30] Foreign Application Priority Data

Aug. 1, 1995 [JP] Japan ................. 7-215232

[51] Int. Cl.$^6$ ............. G06K 15/14; G06T 5/30; H04N 1/29; H04N 1/409
[52] U.S. Cl. ............. 395/109; 382/266; 382/256; 358/447; 358/300
[58] Field of Search .............. 395/109, 110; 382/258, 256, 266, 267, 269; 358/300, 296, 298, 458, 456, 455, 447; 347/131, 240

[56] References Cited

U.S. PATENT DOCUMENTS 5,117,294  5/1992  Yano .................. 358/447
5,404,233  4/1995  Nagata et al. ......... 382/269
5,581,358  12/1996  Seto et al. ............ 358/298

FOREIGN PATENT DOCUMENTS 6222771  10/1987  Japan.
2144574  6/1990  Japan.
564922   3/1993  Japan.
6198958  7/1994  Japan.

*Primary Examiner*—Scott A. Rogers
*Attorney, Agent, or Firm*—Loeb & Loeb LLP

[57] ABSTRACT

According to the invention, video data which are incapable of sufficiently reducing toner consumption through thinning-down control inclusive of edge detection, is divided into unit elements to increase the apparent dot matrix number of each letter or character, and the unit elements thus obtained are reconstituted through an image smoothing process or a pseudo image density increasing process for thinning-down control again. When a pixel is divided into four divisions, for instance, substantially the same effect as of thinning-down control of a letter of apparently four times the size is obtainable. Dense thinning-down control is thus obtainable.

4 Claims, 19 Drawing Sheets

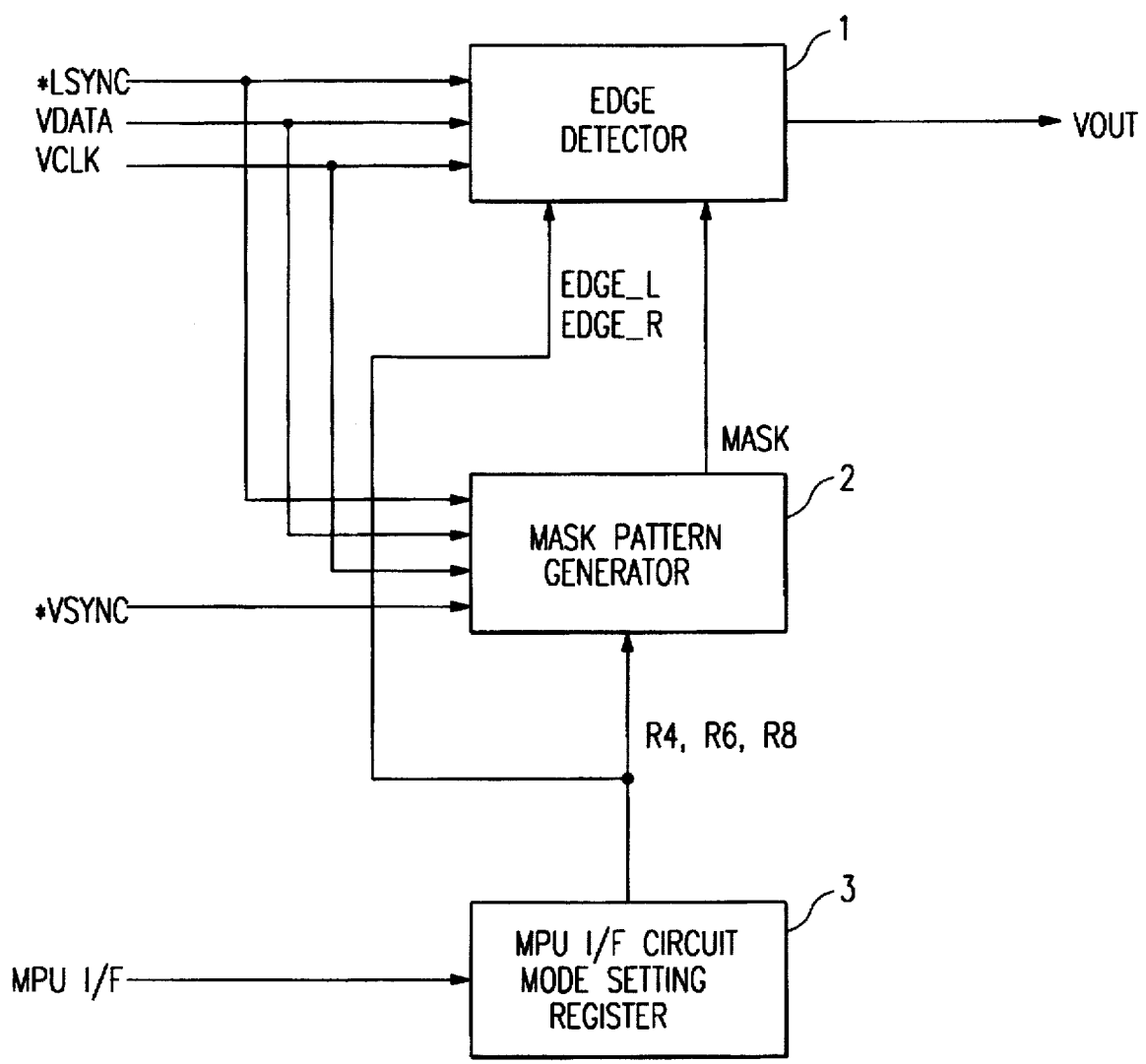

FIG. 2(A)
EDGE DETECTION PATTERN
| EDGE-L | EDGE-R | MODE | DETECTION PATTERN |
|---|---|---|---|
| 0 | 0 | OFF-EDGE | - |
| 1 | 0 | LEFT EDGE | 1 |
| 0 | 1 | RIGHT EDGE | 2 |
| 1 | 1 | BOTH SIDE OF EDGE | 3 |
DETECTION PATTERN  1  
2  
3   OR 
○ WHITE
◉ BLACK
⊘ WHITE OR BLACK
FIG. 2(B)
THINNING-DOWN PATTERN
| R4 | R5 | R6 | THINNING-DOWN MODE |
|---|---|---|---|
| 1 | 0 | 0 | 3-DOT THINNING-DOWN |
| 0 | 1 | 0 | 5-DOT THINNING-DOWN |
| 0 | 0 | 1 | 7-DOT THINNING-DOWN |
INPUT DATA
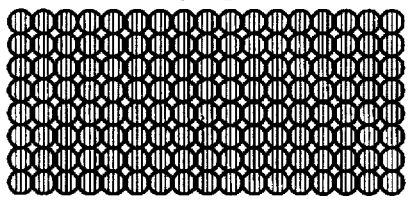
3-DOT THINNING-DOWN
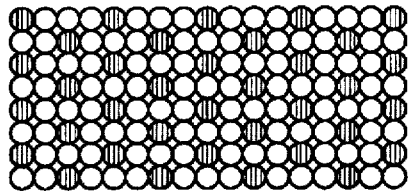
5-DOT THINNING-DOWN
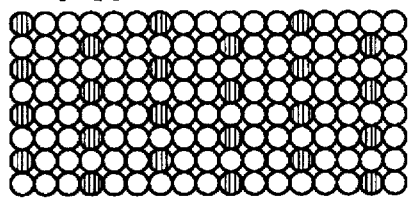
7-DOT THINNING-DOWN
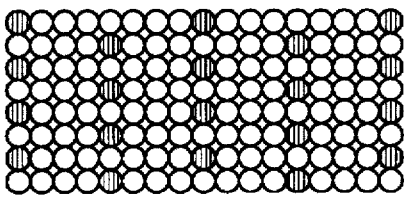

Mask pattern generator block diagram

FIG. 11

| | D0 | D1 | D2 | D3 | Mode |
|---|---|---|---|---|---|
| | 0 | 0 | 0 | 0 | Edge OFF |
| | 1 | 0 | 0 | 0 | Upper edge ON |
| 16 types | 0 | 1 | 0 | 0 | Left edge ON |
| | 1 | 1 | 0 | 0 | Upper and Left edges ON |
| | ⋮ | | | | ⋮ |
| | 1 | 1 | 1 | 1 | All edges ON |

Normal print bit a ⟶

Thinning-down print bit
(Edge-OFF)

a ⟶

Thinning-down print bit
(Edge-ON)

a ⟶

(ORIGINAL VIDEO DATA)

(IN A PIXEL THINNING-DOWN STEP)

(UNIT ELEMENT GENERATION STEP)

(UNIT ELEMENT RECONSTITUTING STEP)

(UNIT ELEMENT THINNING-DOWN STEP)

METHOD AND APPARATUS FOR FORMING IMAGES USING A PRE AND POST SMOOTHING BIT THINNING DOWN PROCESS

BACKGROUND OF THE INVENTION

1. Field of the Invention

This invention relates to reducing consumed toner on the engine side of image forming devices for forming dot matrix images, such as laser printers, LED printers, other page printers and electrophotogaphic recorders utilized for facsimile systems and digital copiers.

2. Description of the Prior Art

In a well-known laser printer, in which a laser beam having been modulated according to video data outputted serially from an image controller repetitively optically scans a photosensitive drum along a bus line thereof in a main scanning direction to form a dot matrix pixel pattern.

In a well-known LED printer, an array image forming means arranged as a line extending in a main scanning direction is "on" controlled in one line at the same time or in units of blocks according to video data to form a pixel matrix pattern on a photosensitive drum being moved relatively in an auxiliary scanning direction.

In either of these printers, a latent dot image that has been written on the photosensitive drum is developed using a development toner to obtain a toner image, which is then transferred onto a transfer sheet and then fixed by a fixing unit. In these printers, the consumption of toner greatly influences running cost. Besides, the print quality of these page printers is very high, for instance 300 or 600 dpi. Therefore, in such cases as when recognizing the print format or when recognizing produced documents, it is required to suppress the toner consumption rather than to provide for high print quality.

As such image forming systems of toner saving type, those of dot thinning-down type or line thinning-down type have been proposed in large numbers. Thinning down odd dots or odd lines uniformly, however, undesirable results in fine line print forms having horizontal or vertical fringe patterns.

Accordingly, it has been proposed a technique in which, instead of thinning down odd dots uniformly, different dots are thinned down in the odd and even lines, that is, a mode selecting circuit functions to cause thinning-down of odd dots in odd lines and even dots in even lines (this technique being disclosed in Japanese Laid-Open Patent Publication 62-227771 and hereinafter referred to as staggered thinning-down technique).

In such a system, the thinning-down is controlled independently of the print font shape and may result in disturbance of the print shape.

To overcome this drawback, it has been proposed to detect edge dots at borderlines of the print and thin down the other dots than the edge dots in a prescribed rule without thinning down the edge dots (this technique being disclosed in Japanese Laid-Open Patent Publication No. 2-144574 and hereinafter referred to as edge detection techniques).

The staggered thinning-down technique and the edge detection technique, however, have been developed independently of each other, and with the above prior art techniques it is very difficult to use the two techniques in combination.

SUMMARY OF THE INVENTION

This invention was made in view of the above drawbacks inherent in the prior art, it has an object of providing a technique concerning the image formation of toner saving type, which permits the staggered thinning-down and edge detection in a toner saving mode to be done with a simple circuit construction or under software control.

Another object of the invention is to provide a technique concerning image formation of toner saving type, which permits toner saving without possibility of print shape disturbance.

A further object of the invention is to provide a technique concerning satisfactory readability image formation of toner saving type.

A still further object of the invention is to provide a technique concerning image formation of toner saving type, which can ensure satisfactory readability even of small letters, particularly small letters of 10 points and below.

A yet further object of the invention is to provide a technique concerning image formation of toner saving type, which permits effectively reducing toner consumption while maintaining satisfactory readability even of small letters, particularly small letters of 10 points and below.

The history concerning the invention will now be described.

The applicant has proposed, in an earlier application (i.e., Japanese Patent Application No. 6-27536 filed on Jan. 31, 1994), an invention concerning image formation of toner saving type, in which the staggered thinning-down technique and the edge detection technique are effectively combined in order to ensure satisfactory readability of letters and prevent fine broken lines of print, thus permitting the reduction of consumed toner without sacrifice in the readability of letters.

This earlier invention specifically concerns a system, which comprises edge detecting means for detecting bit level inversion positions by ANDing video data of one or more scan lines and an appropriately set edge pattern designation signal and providing bit data corresponding to level inversion positions, thinning-down means for thinning down the video data by ANDing the video data and predetermined thinning-down pattern designation signal, and means for providing data by ORing the data obtained from the two means. Video data for reducing consumed toner is obtained by shifting the thinning-down pattern designation signal in units of predetermined scan line intervals according to a horizontal sync signal.

In this case, a mode register for storing the thinning-down pattern and/or the edge pattern is suitably constructed such that it has adequately variable content values.

In the system, edge detection can be obtained without any problem in the case of print font or like letter data because the first bit data in this case is a non-print bit of "0". In the case where the first bit data is a print bit as in image data or rule lines, however, that first bit data cannot be detected as an edge because of absence of preceding bit data.

To solve this problem, it is suitable to provide means for providing the fist bit data of each scan line directly when that bit data is a print bit.

In usual video data, the print bits are of binary level "1". However, in some engines the print bits are of binary level "0".

However, it leads to complication of circuit to permit change in a bit thinning-down controller for toner consumption reduction according to the type of the print bits.

Replacement of such a complicated circuit may be made with such an arrangement as to permit video data to be supplied to the bit thinning-down controller for toner consumption reduction after inversion of the data according to a control signal from a CPU and permit the bit thinned-down data from the bit thinning-down controller to be inverted again before being supplied to the engine side either directly or through a smoothing circuit or a pseudo image density increasing circuit.

According to the above earlier invention, the staggered thinning-down and the edge detection are done in a toner consuming mode with a simple circuit, but similar functions may be provided under software control.

In such software control, subsequent to step A of off-setting video data line in units of predetermined scan line intervals according to a horizontal sync signal, step B of bit thinning-down control for each scan line is brought about. The control step B includes step B1 of detecting bit level inversion positions of video data by taking one or more scan lines thereof according to video clock and providing bit data corresponding to the bit level inversion positions, and step B2 of thinning down bit data other than those corresponding to the level inversion positions.

In the step A, the scan line number is divided by a constant m (i.e.,2, 3, ... ), and the video data is off-set in correspondence to the remainder of division. In this way, staggered thinning-down can be obtained easily in units of 2 lines, 3 lines, etc.

For the above software control, step B0 of providing the first bit data of each scan line directly when the data is a print bit, is suitably provided as a step of detecting the first bit data as an edge in the bit thinning-down control step B and before the level inversion position detecting step.

To be able to cope with the video data with print bits of binary level "0" as well, inverting means may be provided to provide print bit of "1" when the binary level is "0" before the step A.

As shown above, according to the earlier invention the staggered thinking-down and edge detection in the toner saving mode can be easily obtained with a simple circuit incorporating logic circuits or under software control by effectively utilizing the horizontal or vertical sync signal.

In addition, according to the earlier invention edge patterns and thinning down patterns can be selected as desired by the mode selecting register, so that it is possible to obtain the most suitable toner saving according to the status of print and type of the outputted print.

A further feature of the earlier invention is that it is possible to obtain edge detection not only uni-dimensionally in the main scanning direction but also two-dimensionally in the main and auxiliary directions.

Moreover, the earlier invention can be used without limitation to the type of video data, that is, it can be used commonly to both the video data with the print bits of binary level "1" and that with the print bits of binary level "0".

According to the earlier invention, as noted above, a print bit is always provided in correspondence to an edge position, thus providing for satisfactory readability of letters. However, the print of a small letter of 10 points or below at 300 dpi corresponds to a dot matrix of substantially 40×40 dots or below (in case of 10 points). Therefore, in comparison to normal mode print of letter (a) as shown in FIG. 14(A), the readability of thinned-down letter obtained as a result of mere staggered thinning-down is reduced, as shown in FIG. 14(B), due to a considerable amount of thinning-down. On the other hand, the earlier invention described above as shown in FIG. 14(C), has a problem that the ratio of the number of the edge print dots of a letter to the total print dot number thereof is the higher the smaller the print letter, so that reduction of the toner consumption can not be obtained.

According to the invention, video data which cannot permit sufficient toner consumption reduction through the thinning-down control including the edge detection according to the earlier invention, is subjected to unit element division to increase the apparent dot matrix dot number of each letter. (For example, the same effect as increasing the letter size to four times is obtainable by dividing the pixel into four unit elements.) The unit elements thus obtained are reconstituted through an image smoothing process or a pseudo image density increasing process and then thinned down. For example, when the pixel is divided into four unit elements, it is possible to obtain substantially the same effect as obtainable through thinning-down in the case of apparently four times the letter size. Dense thinning-down control is thus possible.

The pixel may be divided in the sole auxiliary scanning direction, in the sole main scanning direction or in both the main and auxiliary scanning directions.

The applicant has proposed a plurality of unit element processors for dividing the video data for each scan line and processing the unit elements thus obtained in an image smoothing process or a pseudo image density increasing process by appropriately inverting the data. For example, an image smoothing circuit is shown in Japanese Laid-Open Patent Publication No. 5-64922, and a pseudo image density increasing circuit is shown in Japanese Laid-Open Patent Publication No. 6-198958.

The invention features inter-bit thinning down video data in units of scan lines (pixel thinning-down step), dividing the thinning-down controlled video data for each scan line unit into a plurality of unit elements in the main scanning line and/or the auxiliary scanning line and rearranging the unit elements thus obtained through an image smoothing process or a pseudo image density increasing process by making adequate data level inversion (rearranging step), inter-bit thinning down the rearranged unit elements in units of unit element lines (unit element thinning-down step), and supplying the inter-bit thinned-down rearranged unit elements to an engine.

The above processes may be carried out software-wise as will be described later. Alternatively, it is possible to permit the two thinning-down processes to be done software-wise while permitting the unit element processing to be done with hardware.

Causing the pixel thinning-down process to be done through staggered thinning-down without edge detection, results in much thinned-down portion as shown in FIG. 14(B). In this case, subsequent control of division of data into unit elements and reconstitution and thinning-down thereof has no effect of improving the reduced readability.

In the case of the earlier invention, pixel (dot) thinning-down is done by providing bit signal corresponding to bit level inversion positions. Thus, satisfactory readability of edges can be ensured, as shown in FIG. 14(C), even with small letters, although toner is less reduced.

According to the invention, the data division into unit elements and reconstitution thereof are done in this state to increase the apparent dot matrix dot number before control of thinning down the reconstituted unit elements. Thus, dense thinning-down control is possible, and both the readability and the toner reduction effect can be more readily satisfied.

The pixel thinning-down process is thus suitably done through bit thinning down the video data in units of scan lines by providing the bit signal corresponding to the bit level inversion positions.

The invention as above is carried out by a system comprising:

a pixel thinning-down control circuit for inter-bit thinning down video data in units of scan lines;

a unit element processing circuit for dividing the video data for each scan line unit into a plurality of unit elements in the main scanning direction and/or the auxiliary scanning direction and rearranging the unit elements thus obtained through an image smoothing process or a pseudo image density increasing process by making adequate data level inversion; and a unit element thinning-down control circuit for inter-bit thinning down the rearranged unit elements in units of unit element lines.

As described before, the readability can further improved by providing the pixel thinning-down control circuit with edge detecting means for detecting bit level inversion positions and providing bit data corresponding to the detected positions.

The functions of the invention will now be described with reference to FIGS. 15(A) to 15(B).

(A) Original video data

Shown in FIG. 15(A) is original video data considered, which has edges at positions I/d, I/f, II/a and II/c.

(B) In a pixel thinning-down step, the pixels (bit data) at the non-edge positions I/e and II/b are thinned down, as shown in FIG. 15(B). Specifically, the print or data pixels at the positions I/e and II/b are inverted to blank pixels.

(C) Unit element generating step

The pixels including the blank pixels as produced above are divided for each scan line into unit elements (i.e., four unit elements in the auxiliary scanning direction in this example), as shown in FIG. 5(C).

(D) Unit element reconstituting step

The unit elements produced in the above way (including plank unit elements) are reconstituted for thinning them down or smoothing them, as shown in FIG. 15(D). Specifically, the data unit elements I/d1 and II/c4 in the data pixels I/d and II/c are inverted to blank unit elements, and the blank unit elements I/c3, I/c4 II/d1 and II/d2 in the blank pixels I/c and II/d are inverted into data unit elements.

(E) Unit element thinning-down step

Among the unit elements thus reconstituted, suitable data unit elements are thinned down, as shown in FIG. 5(E). At this time, the edge detection may not be done according to the invention. Of course, however, the readability can be further improved by executing the edge detection.

As shown above, according to the invention the apparent dot matrix number of each letter is increased by dividing data into unit elements and reconstituting these unit elements, and the reconstituted unit elements are thinned down afresh. It is thus possible provide for denser thinning-down control and more readily satisfy both enhanced readability and consumed toner reduction.

According to the invention, it is thus possible to obtain staggered thinning-down and edge detection in a consumed toner reducing mode with a simplified circuit construction or through simple soft control while permitting reduction of consumed toner and without possibility of disturbance of the print shape.

BRIEF DESCRIPTION OF THE DRAWINGS

FIG. 1 is a block diagram showing a basic structure according to an earlier invention (uni-dimensional edge processing);

FIG. 2(A) shows edge detection patterns used in the system shown in FIG. 1, and FIG. 2(B) shows thinned-down patterns obtained in the system shown in FIG., 1;

FIG. 11 is a view showing edge selection modes used in the edge detector shown in FIG. 9;

1 ... edge detector, 2 ... mask pattern generator, 13 ... control logic (MPU), 3 ... mode setting register, 11 ... LED head, 14 thinning-down control step I, 15 ... unit element processor, 16 ... photo-sensitive drum, 40 ... line number detector, 100, 100'... thinning-down control step II

DETAILED DESCRIPTION OF THE PREFERRED EMBODIMENT

Art embodiment of the invention will now be described with reference to the drawings. Unless specifically described, the sizes, materials, shapes, relative descriptions, etc. of constituent parts described in the embodiment, are by no means limitative but are merely exemplary.

Figure 3:
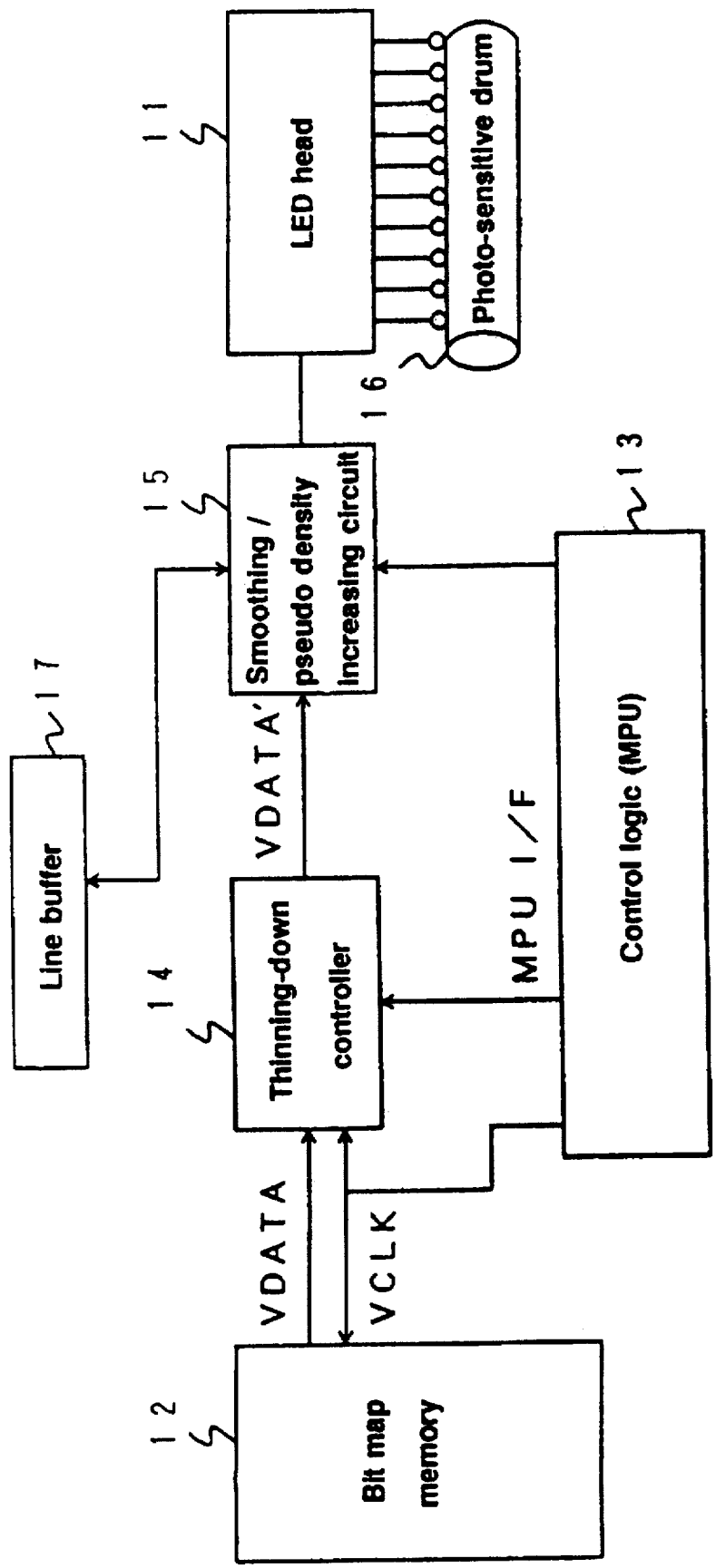
FIG. 3 is a block diagram showing an image processor incorporating the earlier invention noted above (uni-dimensional edge processing)

FIG. 3 shows the structure of an LED printer or a laser printer employed according to the earlier invention described above. A bit map memory 12 constituted by a RAM, can store bit map data for a predetermined number of pages. Video data VDATA of 300 dpi is transmitted serially from the bit map memory 12 to a thinning-down controller 14 under control of a video clock VCLK provided from a control logic 13.

The thinning-down controller 14 thins down the input video data to provide thinned-down video data VDATA', which is supplied to a smoothing/pseudo density increasing circuit 15. The smoothing/pseudo density increasing circuit 15 provides pseudo density increased video data to the LED head (or laser circuit) 11, which exposes a print engine side photo-sensitive drum 16, thereby forming a latent image of toner saving type.

The control logic 13 is constituted by am MPU which provides vertical and horizontal sync signals and other control signals as well as the video clock noted above to corresponding circuits. For the smoothing or pseudo density increasing of video data, thinning-down control is done with reference to a plurality of lines of bit map data as will be described later. To this end, reference line data is tentatively stored in a line buffer 17.

The thinning-down controller 14 for toner saving, as shown in FIG. 1, includes an edge detector 1, a mask pattern generator 2, and a mode setting register 3 which supplies control signals from the control logic (MPU) 13 various circuits. In the mode setting register 3 edge detection patterns as shown in FIG. 2(A) and thinning-down patterns as shown in FIG. 2(B) are stored, and one or more of them are selected through an MPU I/F under control of an MPU (not shown).

The edge detection patterns shown in FIG. 2(A) are in such an arrangement that signal "10" is provided in response to the detection of the sole left edge L, signal "01" in case of the sole right edge R, signal "11" in case of both the edges, and signal "00" in case of no edge, these signals being selected by the mode setting register 3 through the MPU I/F and supplied to the edge detector 1.

The thinning-down patterns shown in FIG. 2(B) are in such an arrangement that signal R4 "100" is selected in the case of three-dot thinning-down, signal R5 "010" in the case of five-dot thinning-down, and R6 "001" in the case of seven-dot thinning-down, these signals being selected by the mode setting register 3 through the MPU I/F and supplied to the mask pattern generator 2.

The above circuits will now be described in detail.

Figure 4:
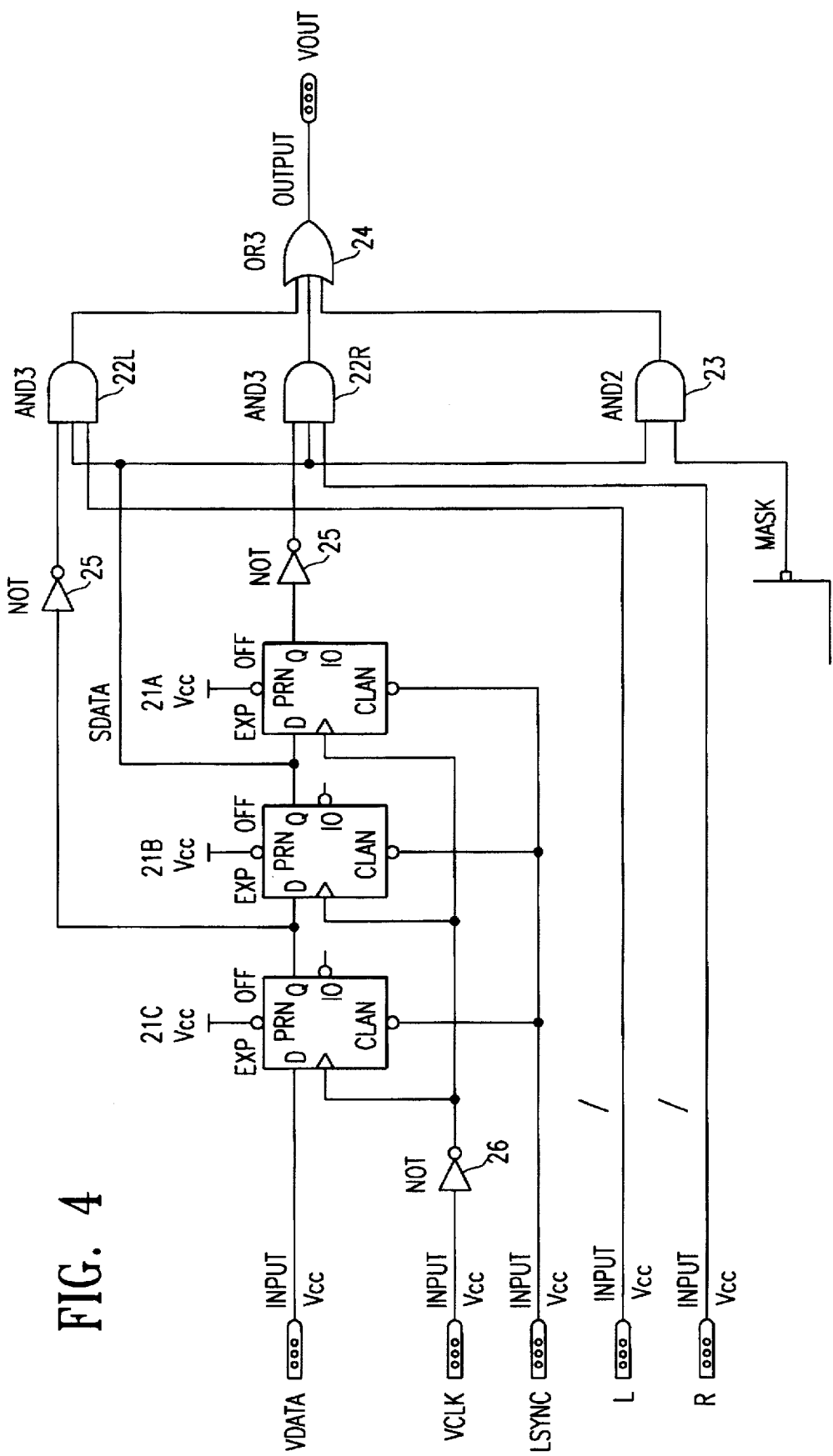
FIG. 4 is a circuit diagram showing an example of edge detector illustrated in FIGS. 2(A) and 2(B)

The edge detector 1, as shown in FIG. 4, includes a three-bit shift register 21, which has three flip-flops 21C 21B and 21A for serially storing respective three, i.e., preceding, present and succeeding, line bit data under control of a video clock, AND gates 22L and 22R for detecting left and right edges, respectively, a no edge AND gate 23 for detecting no edge, the detection modes of these AND gates being as shown in FIG. 2(A), and an OR gate 24 for selectively providing the AND gate outputs. An inverter 25 is provided to invert the input for ANDing in the AND gates 22L and 22R.

The edge detector 1 operates as follows.

After the flip-flops 21A to 21C of the shift register 21 have been reset under control of horizontal sync signal, bit data of the corresponding scan line are provided serially from the first bit.

When a left edge designation signal L is provided from the mode setting register 3, the left edge AND gate 22L ANDs the succeeding and present bit data outputs of the flip-flops 21C and 21B and the designation bit to detect bit data level inversion from "0" to "1". When the succeeding bit data is non-print bit of "0", the present print bit data of "1" is provided as edge data through an OR gate 24.

When a right edge designation signal R is provided form the mode setting register 3, the right edge AND gate 22R ANDs the preceding and present bit data outputs of the flip-flops 21B and 21A and the designation signal to detect bit data level inversion from "1" to "0". When the preceding bit data is non-print bit of "0", the present Print bit data of "1" is provided as edge data through an OR gate 24.

In the case of detecting both the edges, both the left and right edge designation signals are provided form the mode setting register 3 for detection of both edges in a similar operation.

When detecting no edge, no edge designation signal is provided from the mode setting register 3. In this case, the no edge AND gate 23 ANDs a mask signal MSK from the mask generator 2 and the present bit data B, and thus bit data is provided according to the thinning-down designation signal from the mask generator 2.

Figure 5:
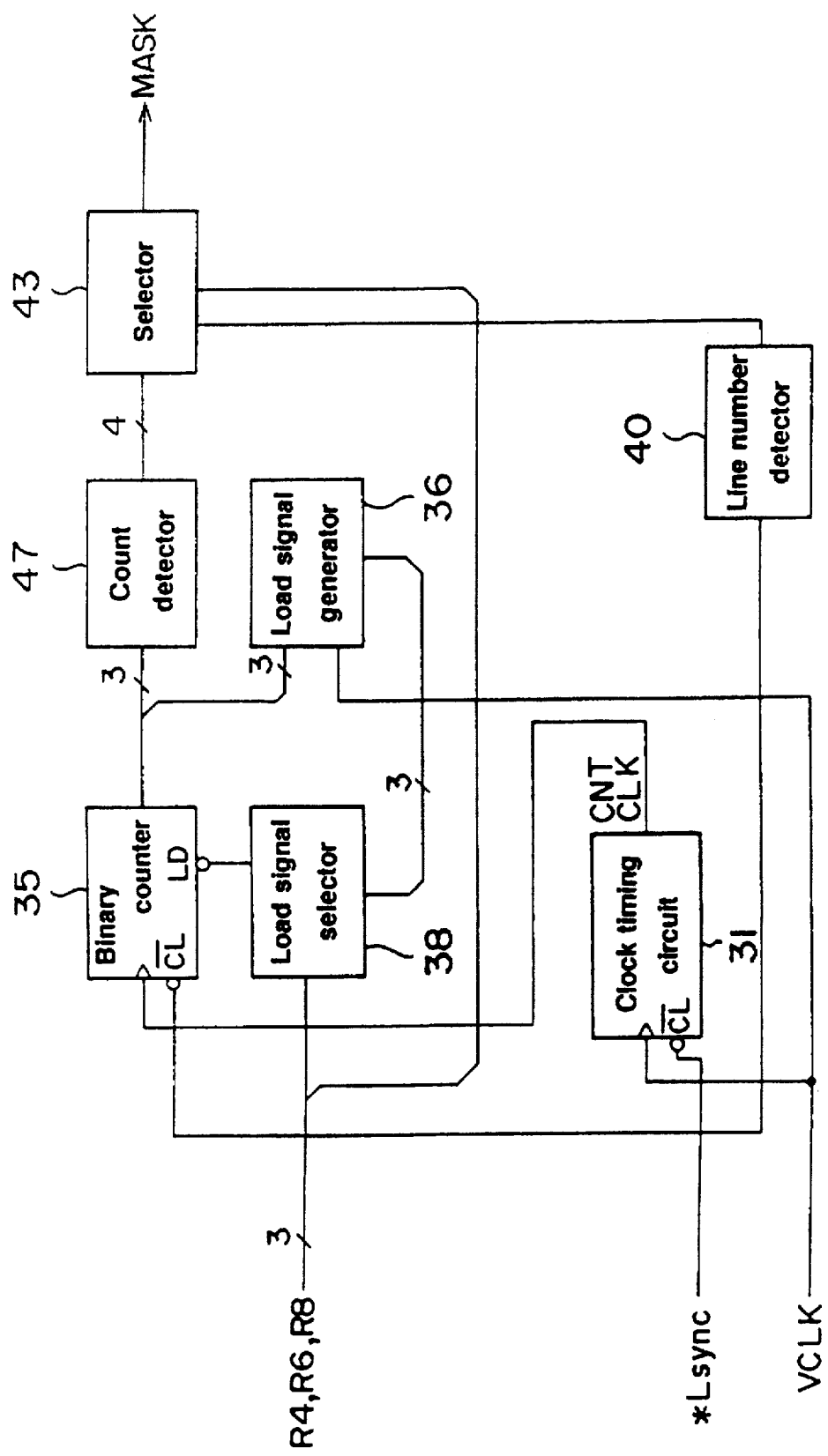
FIG. 5 is a block diagram showing an example of mask generator illustrated in FIGS. 2(A) and 2(B)
Figure 6:
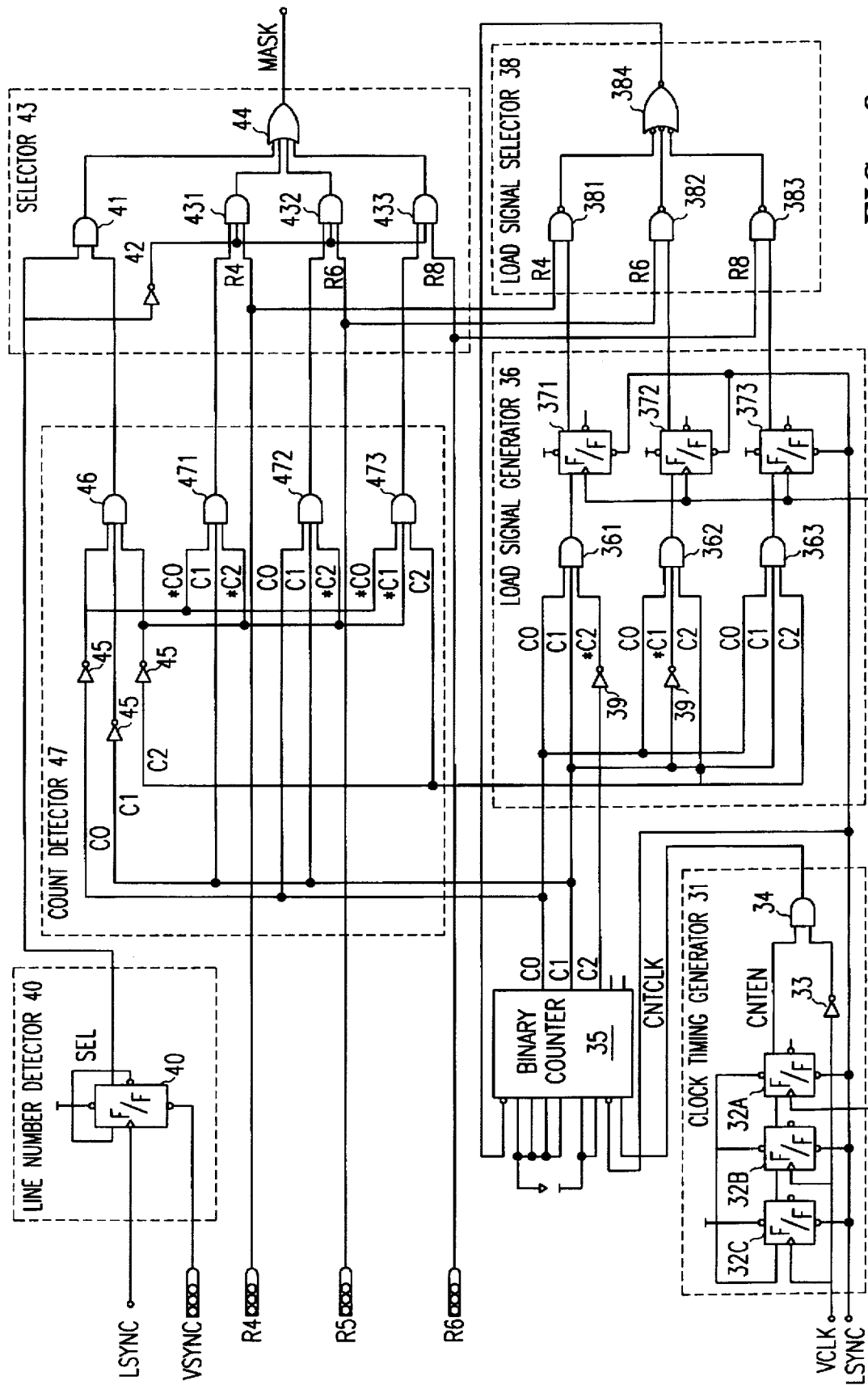
FIG. 6 is a circuit diagram showing an example of the mask generator shown in FIG. 5.
Figure 7:
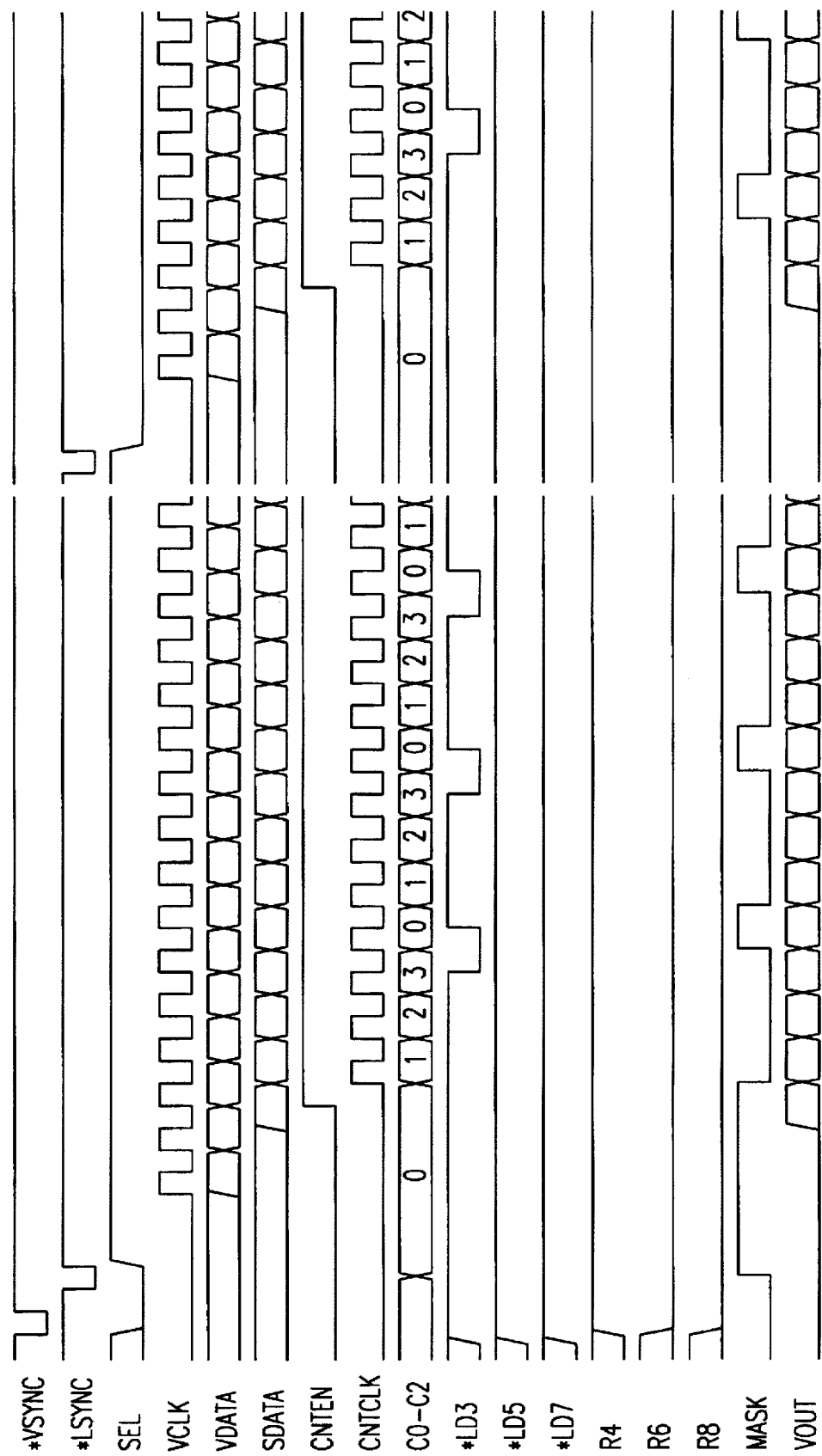
FIG. 7 is a time chart showing waveforms appearing in the circuit shown in FIG. 6.

FIG. 5 is a block diagram showing the mask generator 2, and FIG. 6 is a circuit diagram showing the same mask generator in greater detail. The mask generator 2 will now be described by also having reference to the time chart of FIG. 7. A clock timing circuit 31 shifts VCLK by three clock pulses in correspondence to SDATA from the edge detector 1, and it includes three flip-flops 32C, 32B and 32A, an inverter 33 and an AND gate 34. When three clock pulses of VCLK have been provided, oscillation of counter enable signal CNTEN is caused to be ANDed with the inversion of VCLK in an AND gate 34, whereby counter clock CNTCLK is provided to as binary counter 35.

As R4, R6 and R8, signal "Hi" is provided in correspondence to 3-, 5- and 7-dot thinning-down patterns, respectively, to permit operation of respective AND gates 471 to 473 of a count detector 47 and respective AND gates 361 to 363 of a load signal generator 36.

The load signal generator 36 is provided on the output side of the binary counter 35, and it includes three series circuits corresponding to the respective thinning-down patterns and having respective inverters 39, AND gates 361 to 363 and flip-flops 371 to 373. The load signal from the load signal generator 36 is coupled through a load signal selector 38, which has NAND gates 381 to 383 and a NOR gate 384, to the binary counter 35.

The counter 35 is thus cleared in units of 4 bits with the 3-dot thinning-down pattern, in units of 6 bits with the 5-dot thinning-down pattern, and in units of 8 bits with the 7-bit thinning-down pattern, thus generating a thinning-down pattern designation signal MASK which is recurrent in units of 4, 6 and 8 bits in correspondence to the counter clock CNTCL.

Of the AND gates 361 to 363 in the load signal generator 36, only one becomes effective in correspondence to either of the signals R4 to R6. Specifically, only the AND gate 361 becomes effective since the thinning-down pattern designation signal R4 is "Hi". The counter 35 is thus cleared in units of 4 bits with the 3-dot thinning-down pattern, in units of 6 bits with the 5-dot thinning-down pattern, and in units of 8 bits with the 7-dot thinning-down pattern, to generate a signal recurring in units of 4, 6 and 8 bits, respectively.

Reference numeral 40 designates a line number detector having a flip-flop switching a selection signal SEL between levels "Hi" and "Lo" for every odd or even number of scan lines. After clearing according to the vertical sync signal VSYNC, the line number detector 40 outputs the selection signal SEL which is switched from "Hi" (representing odd lines) to "Lo" (representing even lines) and vice versa whenever the horizontal sync signal LSYNC is inputted.

The selection signal SEL is supplied to an AND gate 41, and is inverted through an inverter 42, which supplies the inverted signal supplied to AND gates 471 to 473 of a selector 43. To the other input terminals of the AND gates 431 to 433 are connected the output terminals of AND gates 471 to 473 of a count detector 47.

One of the AND gates 471 to 473 of the count detector 47 is selected to be effective one in correspondence to either of the signals R4, R6 and R8. In this embodiment, the AND gate 471 is selected because the signal R4 is "Hi".

The AND gates 431 to 433 do not become effective when the inversion of the selection signal SEL is "Lo". Thus, in this embodiment only the line of the AND gates 471 and 431 becomes effective only with the even scan lines, while with the odd scan lines the line of the AND gates 46 and 41 becomes effective. This arrangement permits staggered thinning-down.

Three signal lines C0 to C2 are connected through respective inverters 45 to the AND gate 46, which becomes effective with odd scan lines. Thus, when and only when a pulse in the signal line C3 is generated from the binary counter 35, the signal "Hi" is outputted from the AND gate 46 to be Anded with the selection signal SEL of the odd scan line noted above in an AND gate 41 and then ORed in an OR gate 44 to provide mask signal MASK of "Hi".

Thus, with the odd lines the mask signal MASK OF "Hi" is provided when and only when a pulse is generated on signal line C3, while with pulses on the other signal lines C0 to C2 the mask signal MASK is "Lo". Thus, 3-dot thinning-down is obtained, in which the mask signal MASK recurrently becomes "Hi" for every fourth bit of video data.

The signal lines C0 and C2 are connected through respective inverters 45 to the AND gate 471, which becomes effective with even scan lines, while the signal line C1 is connected directly to the AND gate 471. Thus, when and only when a pulse on the signal line C1 appears from the binary counter 35, the AND gate 471 outputs signal "Hi" to be ANDed with the inversion of the selection signal SEL of even scan line in the AND gate 432 and ORed through the OR gate 44 to provide mask signal of "Hi".

Thus, with the even scan lines the mask signal MASK becomes "Hi" with the appearance of a pulse on the signal line C1 and becomes "Lo" with the pulses on the other signal lines C0, C2 and C3. Thus, 3-dot thinning-down is obtained, in which the mask signal MASK becomes "Hi" for every second bit of video data.

With the above thinning-down control which is done recurrently on the odd and even scan lines, the print bit of "1" is provided for every 2nd, 6th, 10th and so forth bits in even scan lines and every 4th, 8th, 12th and so forth bits in odd scan lines. Consequently, staggered thinning-down is obtained, in which two bits are shifted for every odd or even scan line.

While this embodiment concerns uni-dimensional edge detection in the main scanning direction, it may be necessary to provide for edge detection in the auxiliary scanning direction in combination with the uni-dimensional one as in the case of vertical rule lines.

Figure 8:
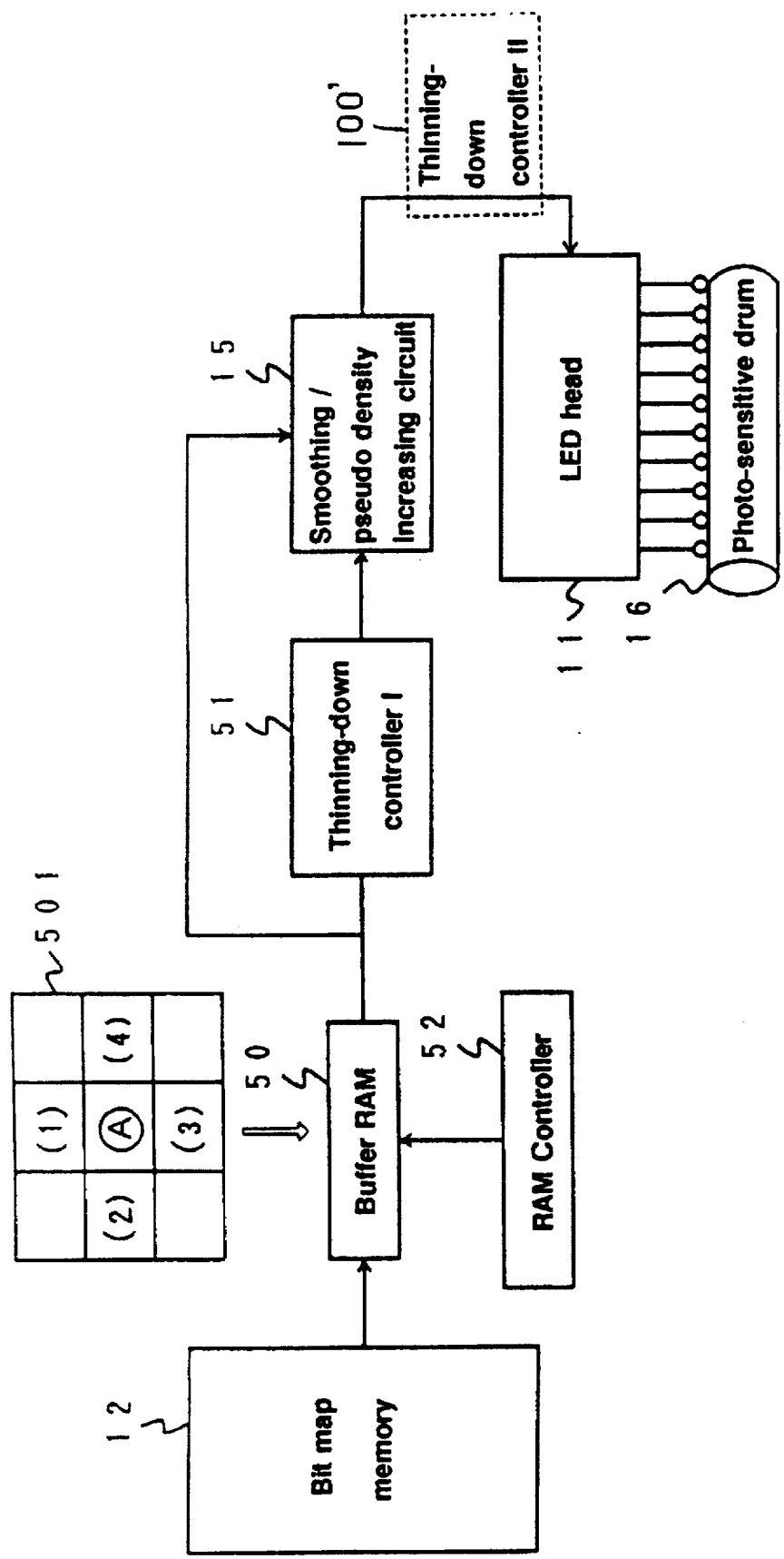
FIG. 8 is a block diagram showing another example of image processor incorporating the earlier invention (two-dimensional edge processing, also partly showing the present invention)

FIG. 8 shows the structure of an image processor for making two-dimensional thinning-down control according to the above earlier invention. A bit map memory 12 stores bit map data for a predetermined number of pages and it provides three scan lines of video data to be stored in buffer RAM 50. Then, a 3×3 sample window 501 is formed according to signal from a RAM controller 52, and edge detection of a noted bit with respect to an upper, a lower, a left and a right adjacent bit is done in a thinning-down controller 51.

Figure 9:
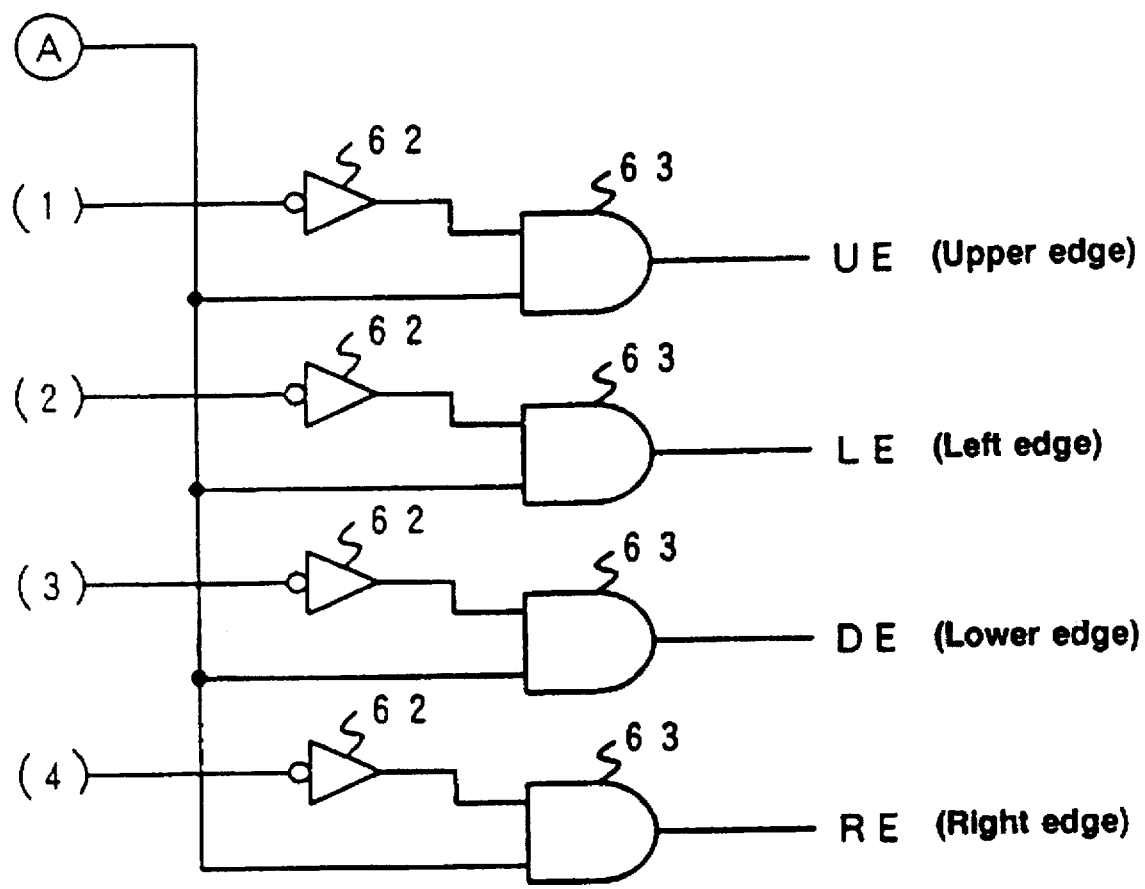
FIG. 9 is a circuit diagram showing an edge detector used for the image processor shown in FIG. 8.

In the edge detector 1, as shown in FIG. 9 and also in the sample window 501 in FIG. 8, the edge detection with respect to the upper, lower, left and right adjacent bits, is done such that the adjacent bits (1) to (4) are inverted through respective inverters 62 and that the inverted bits are each ANDed with the noted bit A through each AND gate 63.

Figure 10:
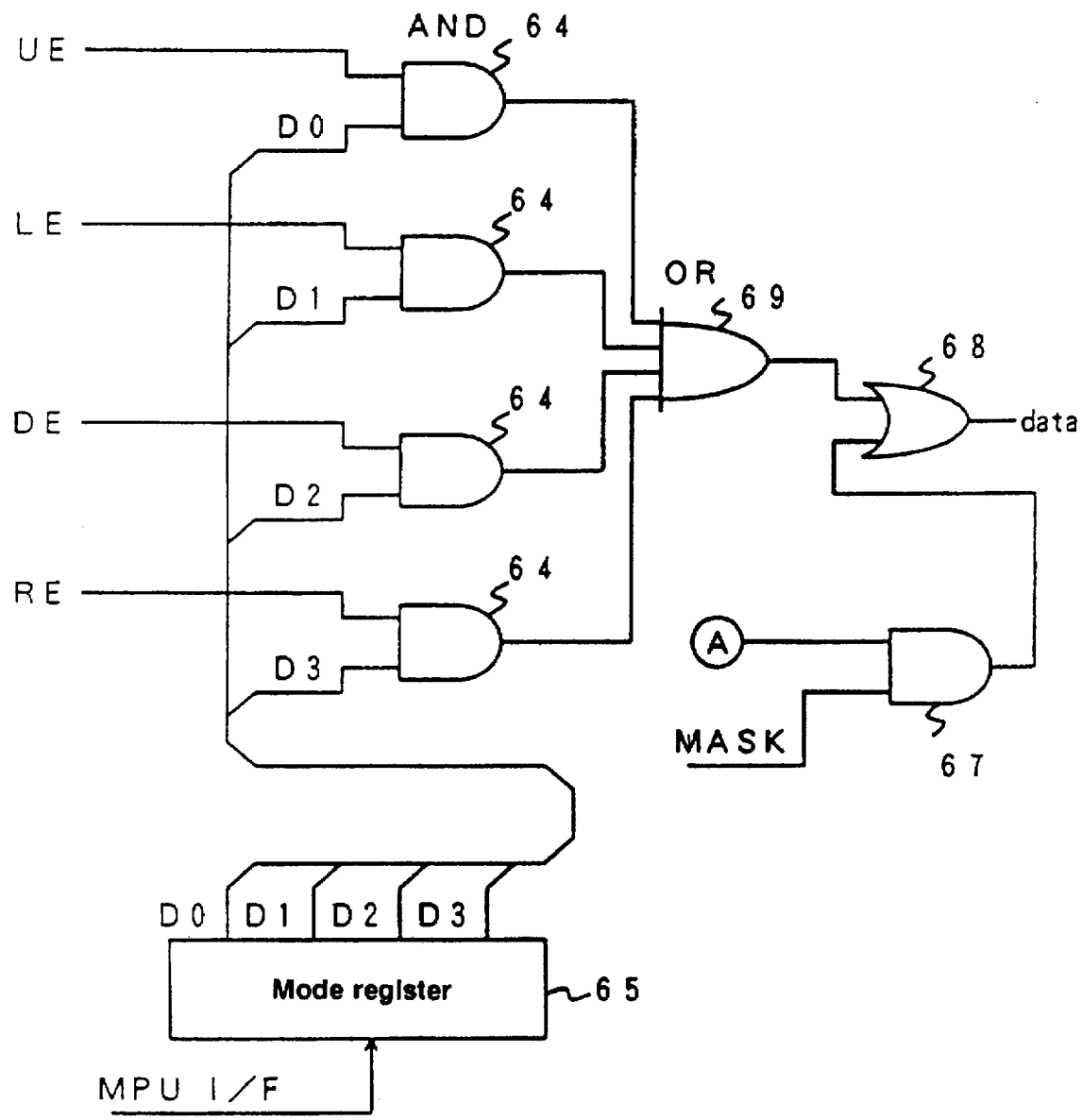
FIG. 10 is an edge selector used for the image processor shown in FIG. 8.

FIG. 10 shows an edge selector for selectively providing the detected edges. The edge selector includes a mode register 65, which selects detected edge modes shown in FIG. 11 supplied to it through the MPU I/F, AND gates 64 for ANDing the data from the mode register 65 and detected edge data obtained from the circuit shown in FIG. 9, and an OR gate 69.

Edge detection pattern data of "0000" to "1111" are selectively supplied through the MPU I/F to the mode register 65.

FIG. 11 shows the detected edge modes. Data "0000" is stored in the mode register 65 when no edge is detected, data "1000" is stored when upper edge is detected, data "0100" is stored when left edge is detected, data "1100" is stored when upper and left edges are detected, and so forth.

The edge selection is done through the ANDing of the detected edge mode data stored in the mode register 65 and the detected edge data shown in FIG. 9 the AND gates 64.

When no edge is detected, masked video data is provided from an OR gate 68 through ANDing of a mask signal MASK and the noted bit A by an AND gate 67.

In this way, a smooth two-dimensional process can be obtained.

The circuit described above is constructed under the assumption of video data, in which print bits to be printed on the photosensitive drum side are "1" while non-print bits are "0". However, an image processor may be constructed in correspondence print engine side characteristics such that print bits are "0" while non-print bits are "1".

In such a case, it is neither usual nor advantageous to construct a thinning-down controller afresh in correspondence to the video data type difference.

Figures 12A, 12B:
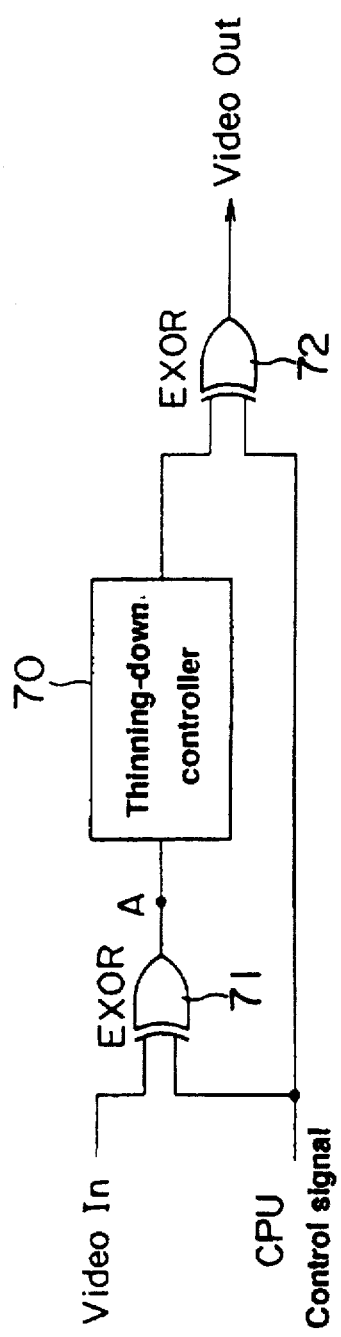
FIGS. 12(A) and 12(B) illustrate the use of a common thinning-down control circuit to different types of video data.

The two different types of video data noted above may both be coped with by using a logic as shown in FIGS. 12(A) and 12(B).

Specifically, the logic circuit shown in FIG. 12(A) includes exclusive OR gates 71 and 72. The exclusive OR gate 71 takes exclusive OR of video data and control data from the MPU, which is either "0" or "1" in correspondence to the type of the video data, and provides an output to a thinning-down controller 70. The exclusive OR gate 72 takes exclusive OR of the thinned-down data output of the thinning-down controller 70 and the control data.

With this circuit, video data with print bits of "0" can be dealt with by generating control data of "1" as shown in FIG. 12(B) in an MPU (not shown). Through exclusive OR of the two data in the gate 71, the video data is inverted before it is inputted to the thinning-down controller 70. It is thus possible to obtain the thinning-down control by using a thinning-down controller for ordinary video data with print bits of "1".

The tinned-down data after the thinning-down control is inverted again through its exclusive ORing with the control data, and thinned-down data with print bits of "0" is to the next step processing circuit or to the engine side.

Video data with print bits of "1" is dealt with by generating control data of "0" as shown in FIG. 12(B). Thus, neither the video data inputted to the thinning-down controller 70 nor the thinned-down data outputted from the thinning-down controller 70 is inverted.

Thus, this arrangement can be used commonly for the two different types of video data, that is, it is not necessary to construct a new thinning-down controller in correspondence to video data type difference.

The exclusive OR gates noted above are by no means limitative for inverting the video data and thinned-down data, and it is also possible to obtain the inversion by using different inverters or software-wise.

The thinning-down control may not be done by using hardware, but it may be done software-wise as well.

Figure 13:
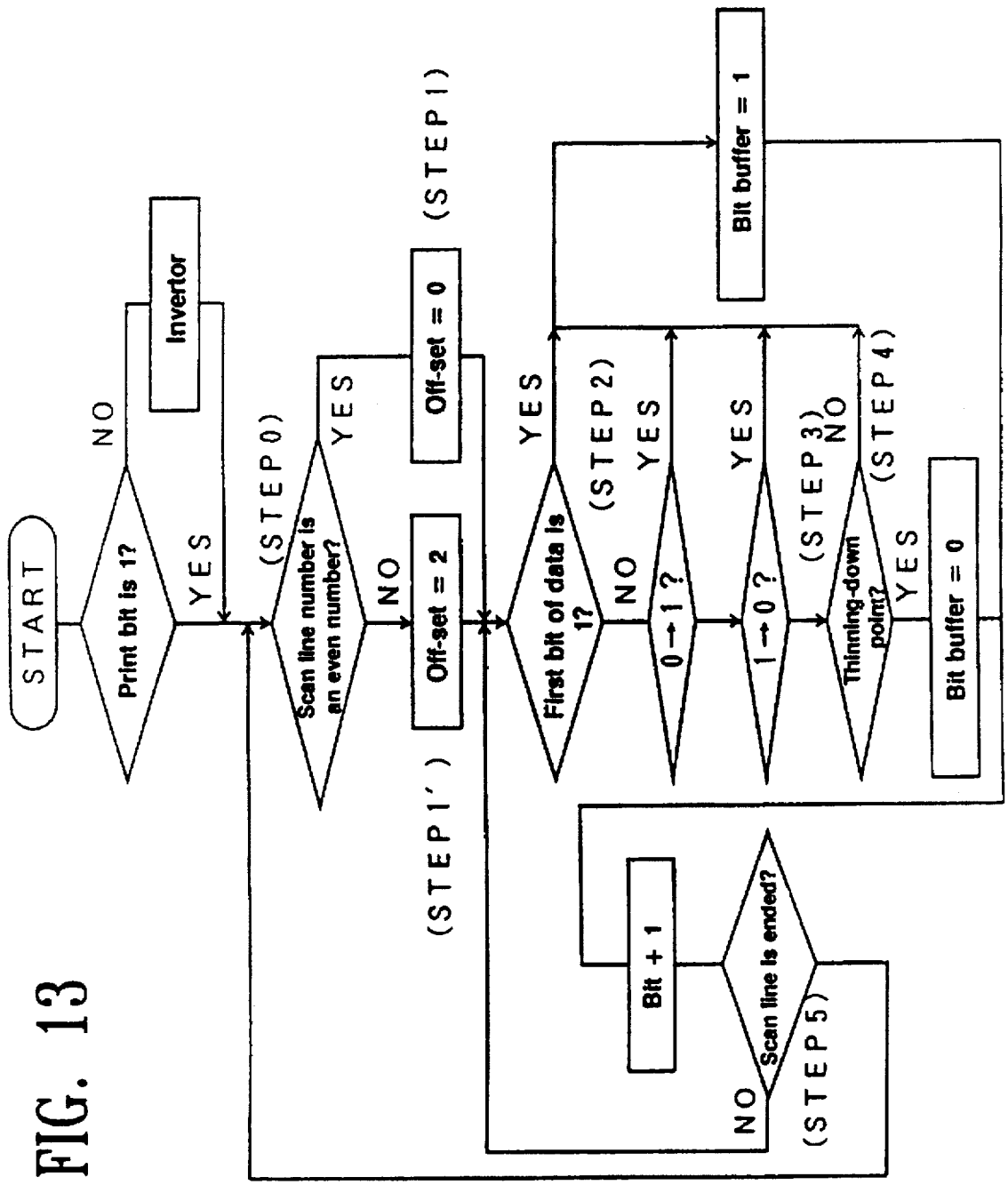
FIG. 13 is a flow chart for describing the basic operation of according to the earlier invention.
Figure 14A:
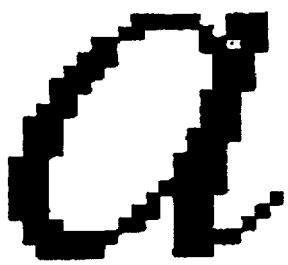
FIGS. 14(a) to 14(c) illustrate an example of print obtained in a prior art toner saving mode.
Figure 14B:
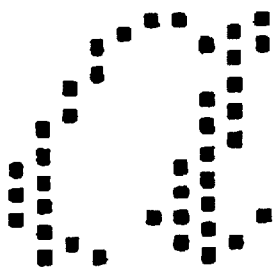
Figure 14C:
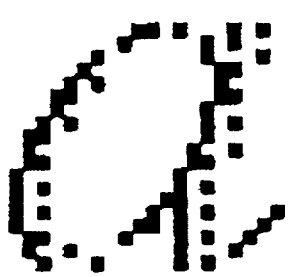

FIG. 13 is a flow chart illustrating software-wise thinning-down control. A check is first made as to whether the print bits of video data to be thinned down is "1" or "0". When the video data is found to be with print bits of "0" it is inverted in an inverter like that shown in FIG. 12(B) or software-wire, and then a line number detection step A is executed (step P0).

In the line number detection step A, a counter is reset in response to the input of a vertical sync signal. Then, in response to the input of a horizontal sync signal scan lines are counted, and the count is divided by constant number m.

When the constant number m is "2", for instance, the remainder is "1" with an odd scan line number and "0" with an even scan line number. Whether the remainder is "1" or "0", and when it is "1" (i.e., with an odd scan line number), a thinning-down process B is executed without off-setting the video data (step P1).

In the thinning-down step B, when the first bit of data of each scan line is a print bit of "1", this bit data is provided without any inversion to be written as print bit of "1" in a bit buffer (step P2).

Then, an edge detection step is executed. A unidimensional process, for instance, involves three different types of edge detection as shown in FIG. 2(B), i.e., left edge detection in case of non-print bit of "0" as the succeeding bit data, the print bit of "1" as the present bit data in this case being taken as edge, right edge detection in case of non-print bit of "0" as the preceding bit data, the print bit of "1" as the present bit data in this case being taken as edge, and two edge detection to take both the left and right edges. In this embodiment, the two edges are taken (step P3).

In the step P3, first a bit level inversion of the succeeding bit relative to the present bit is checked for. When a bit level inversion from "0" to "1" is detected, the present bit data is provided as print bit of "1" to be written in the bit buffer. In this way, the left edge can be detected. Then, a bit level inversion of the present bit relative to the preceding bit is checked for. When a bit level inversion from "1" to "0" is detected, the present bit data is provided as print bit of "1" to be written in the bit buffer. In this way the right edge can be detected.

In the case of a two-dimensional process with reference to reference bits preceding, succeeding, adjacent the left side and adjacent the right side of the present bit, pattern matching may be made software-wise on the basis of the data shown in FIG. 11.

After the edge detection, a check is made as to whether the present bit data corresponds to a thinning-down point. When the data corresponds to the thinning-down point, a non-print bit of "0" is written in a bit buffer, while otherwise a print bit of "1" is written in the print buffer (step 4).

The thinning-down position may be set hardware-wise by using the mode setting register 3 or the like, or it may be set software-wise through counting of video clock.

After the above step is over, the bit position is incremented by one bit, and the same thinning-down operation is done repeatedly (step 5).

When the bit thinning-down control for one scan line is ended, the routine goes back to step 1'. Upon input of the next horizontal sync signal, the line count is divided by constant m. When the remainder is zero (i.e., with an even number), the video data is off-set by two bits, and then the above thinning-down control step is executed.

While the thinning-down control is made by after line in the above way, since the video data is off-set by two bits for every even lines, the thinning-down position is delayed by two bits compared to the preceding scan line. Repeatedly doing this permits staggered thinning-down.

With the above technique, it is possible to easily obtain thinning-down control in toner saving mode by simply making staggered thinning-down and edge detection by making effective use of the horizontal or vertical sync signal.

In addition, a most suitable toner saving mode can be set in correspondence to the type of print by appropriately. omitting or adding the above step.

According to the earlier invention, print is always done at the edge position. Therefore, with small letters of 10 points and below, the ratio of the edge print dot number to the overall print dot number of letter is the higher the small is the letter, so that the toner consumption is not reduced although the readability of letters is improved.

In the embodiment of the invention, while it is the same as the above prior art technique so far as the video data is bit thinned down in units of scan lines in the above method, a circuit is further provided, which divides the video data into a plurality of unit elements for every scan line unit, reconstitutes the unit elements through an image smoothing process or a pseudo image density process by appropriately inverting the unit elements (unit element reconstitution step), bit thins down the reconstituted unit elements for every unit element line (unit element thinning-down step), and supplies the resultant video data to the engine side.

Figure 16:
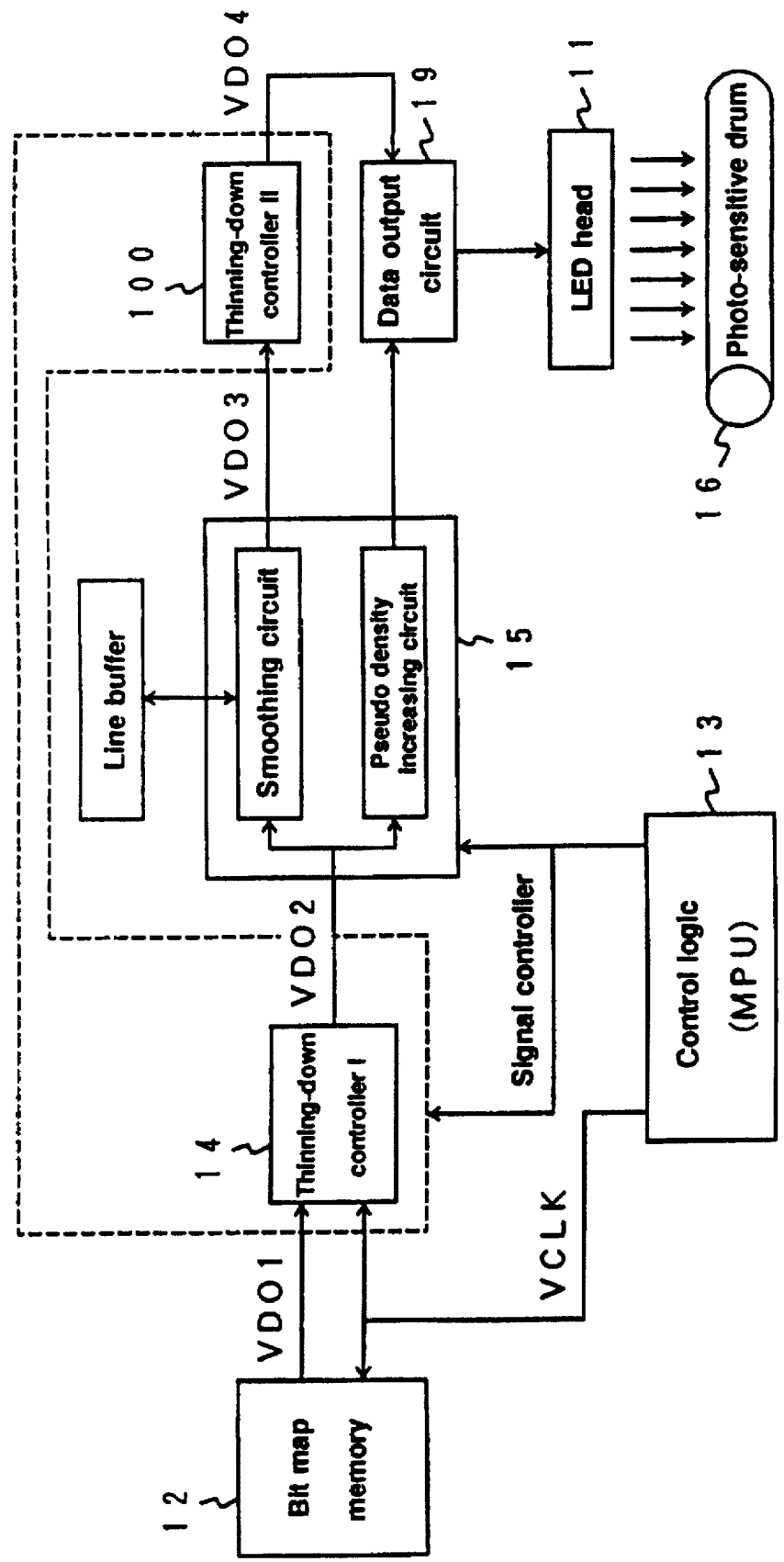
FIG. 16 is a block diagram showing an image processor incorporating the present invention (uni-dimensional edge processing)

FIG. 16 shows the structure of an image processor according to the invention corresponding to FIG. 3 and used for an LED printer or a laser printer. Video data VDO1 of 300 dpi is supplied serially from a bit map memory 12 constituted by an SRAM, in which bit map data for a predetermined number of pages is stored, to a thinning-down controller I 14 under control of a video clock VCLK supplied from a control logic 13.

The thinning-down controller I 14 produces appropriately thinned-down video data VD02 supplied to a unit element processor 15. In the unit element processor 15, the thinned-down video data VD02 is divided for each scan line unit into a plurality of unit elements in the auxiliary scanning direction, and reconstituted through an image smoothing process or a pseudo image density increasing process by suitably inverting the unit elements thus obtained.

Unit element data VD03 obtained through the data division and reconstitution in the unit element processor 15, is bit thinned down for each unit element line in a unit element thinning-down controller II 100.

Figure 15A:
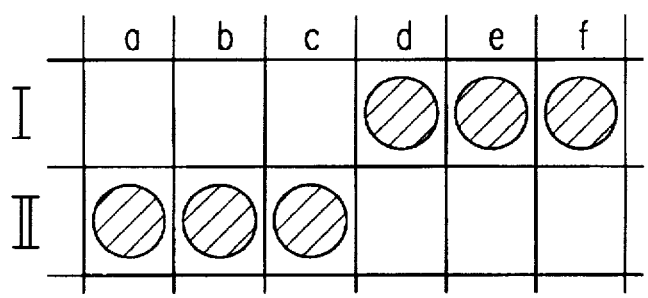
FIGS. 15(A) to 15(E) are views illustrating a toner consuming procedure according to the present invention.
Figure 15B:
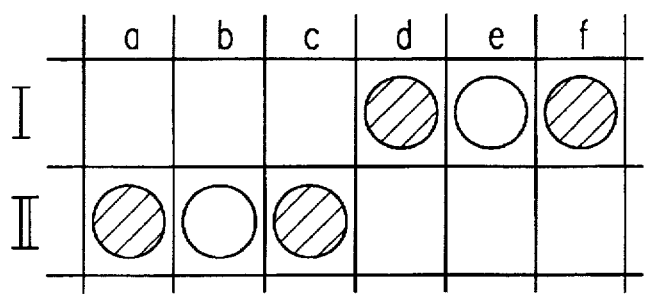
Figure 15C:
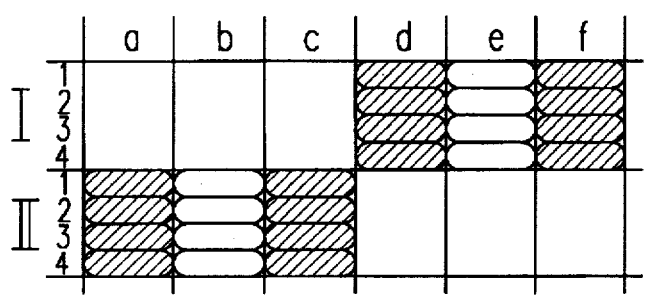
Figure 15D:
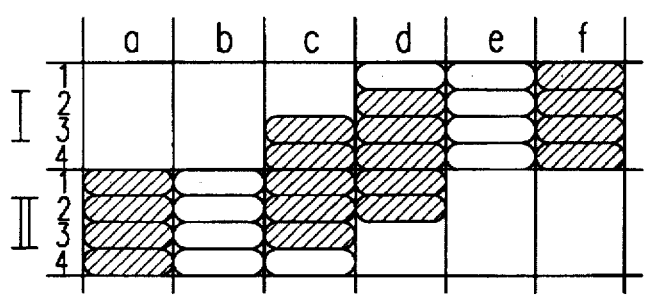
Figure 15E:
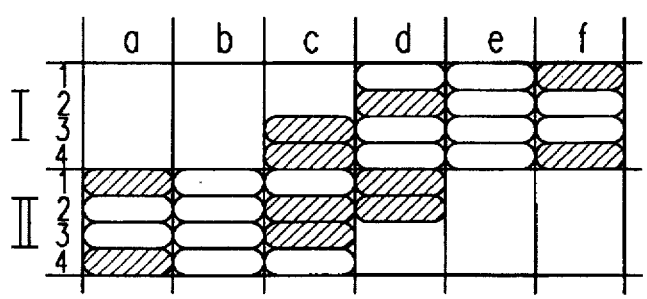

The bit thinned-down unit element data VD04 thus obtained is supplied serially to a parallel data output circuit 19 according to a ¼ video clock signal to be supplied from the circuit 16 as parallel data to an LED head 11, which provides one scan line bits (static drive) or a predetermined number of bits (dynamic drive) for exposure of a print engine side photosensitive drum 16. In this way, unit element line exposure is done four times for one scan line, whereby a toner saving type image as shown in FIG. 15(E) is formed.

The user can select a semi-toner saving mode giving preference to readability, in which the unit element data is not bit thinned down through the unit element thinning-down controller II 100 but is directly supplied serially to the parallel data output circuit 19.

In an image processor in which two-dimensional thinning-down control is done, a unit element thinning-down control circuit II 100' may be provided as shown enclosed in a dashed line rectangle 100' in FIG. 8.

In this embodiment, the exposure of the photosensitive drum is done four times with the same data at four times the data transfer speed (corresponding to ¼ of the video clock and ¼ of the exposure time) and with the same exposure energy as in the case when the pixel division exposure control is not done.

The unit element thinning-down controller II 100 for consumed toner reduction control, permits reducing energy provided to the photosensitive drum through four-stage control. Thus, while the pixel division exposure control is done by executing the data on-off control or thinning-down control four times in units of scan lines, the photosensitive drum can be exposed through four-stage exposure control. This means that the dot image formation on the photosensitive drum is done not through on-off thinning-down control but through a control just like image density control.

Figure 17:
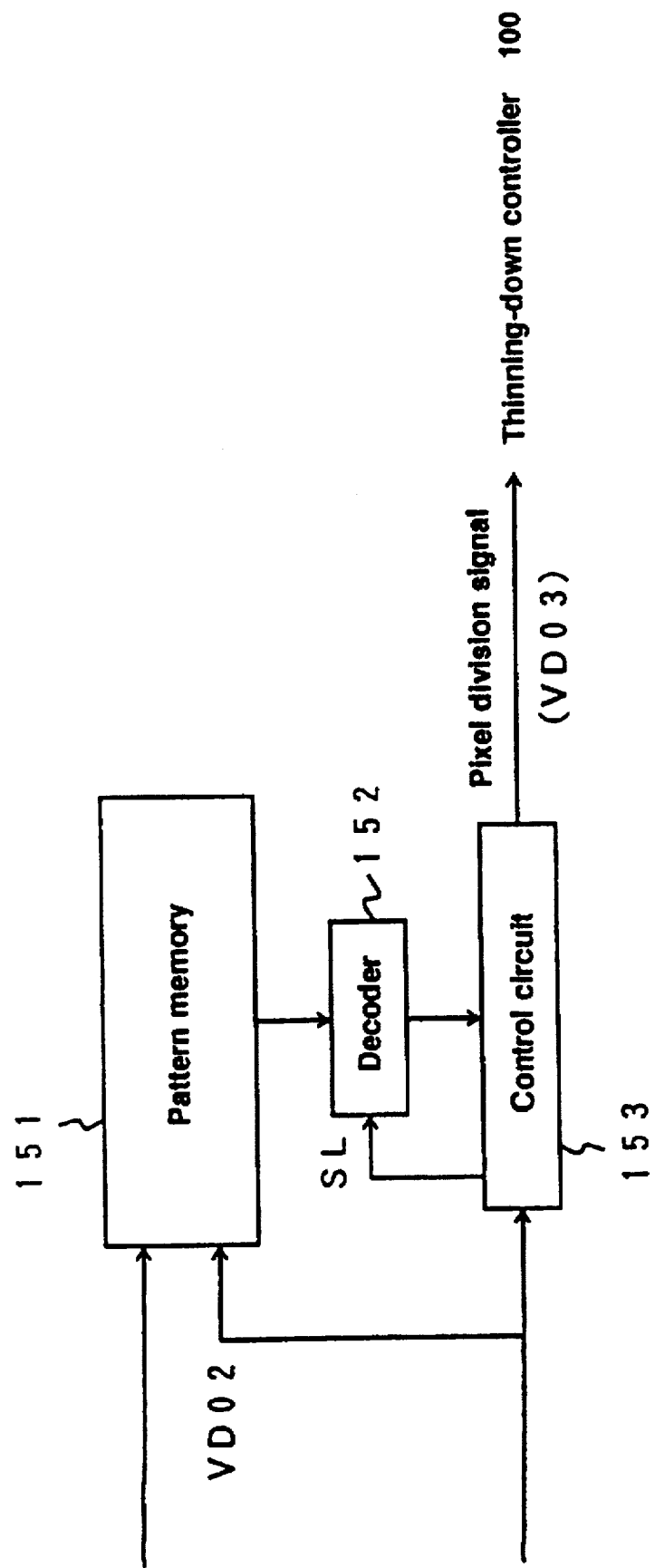
FIG. 17 is a block diagram showing a unit element processor for a smoothing process in the image processor shown in FIG. 16.

FIG. 17 shows an example of the unit element processor for the smoothing process noted above. Reference numeral 151 designates a pattern memory. Pixel signal lines to be outputted and also those corresponding to one or more preceding and succeeding pixel signal lines, are stored in the memory 151 while one scan line of pixel signal developed in a video memory (nor shown), for instance, is inputted serially to the memory 151 according to ¼ time reference video clock signal.

Reference numeral 152 is a decoder also serving as a logic circuit. With reference to adjacent image data to a noted pixel in the pattern memory 151, more specifically image data in dot matrix Rx1 for R dots in the main scanning direction and x dots in the auxiliary scanning direction, a predetermined circuit in the decoder 152 generates a pixel division signal corresponding to each of unit elements, which correspond to data taken by a controller 153 and are represented by a selector signal SL, according to the selector signal SL.

The pixel division signal from the decoder 152 is supplied serially through the controller 153 to the unit element thinning-down controller II 100 or directly to the parallel data output circuit 19 according to the ¼ time reference video clock CLK.

Meanwhile, successive noted pixels *2, *3, . . . are generated through bit-by-bit main scanning direction shift of image data (Rxn) in the memory 151 to be referred to according to the ¼ reference video clock CLK whenever the pixel division signal is transferred to a shift register, for instance, and unit element signal obtained as a result of the pixel division for one scan line corresponding to a first unit element line P1, is transferred to the unit element thinning-down controller II 100 through the controller 153 or to the parallel data output circuit 19. After this transfer, the selection signal SL is switched to cause a unit element signal corresponding to a second unit element line P2 to be provided form the logic circuit assembled in the decoder 152. The above operation is done recurrently.

Figure 18:
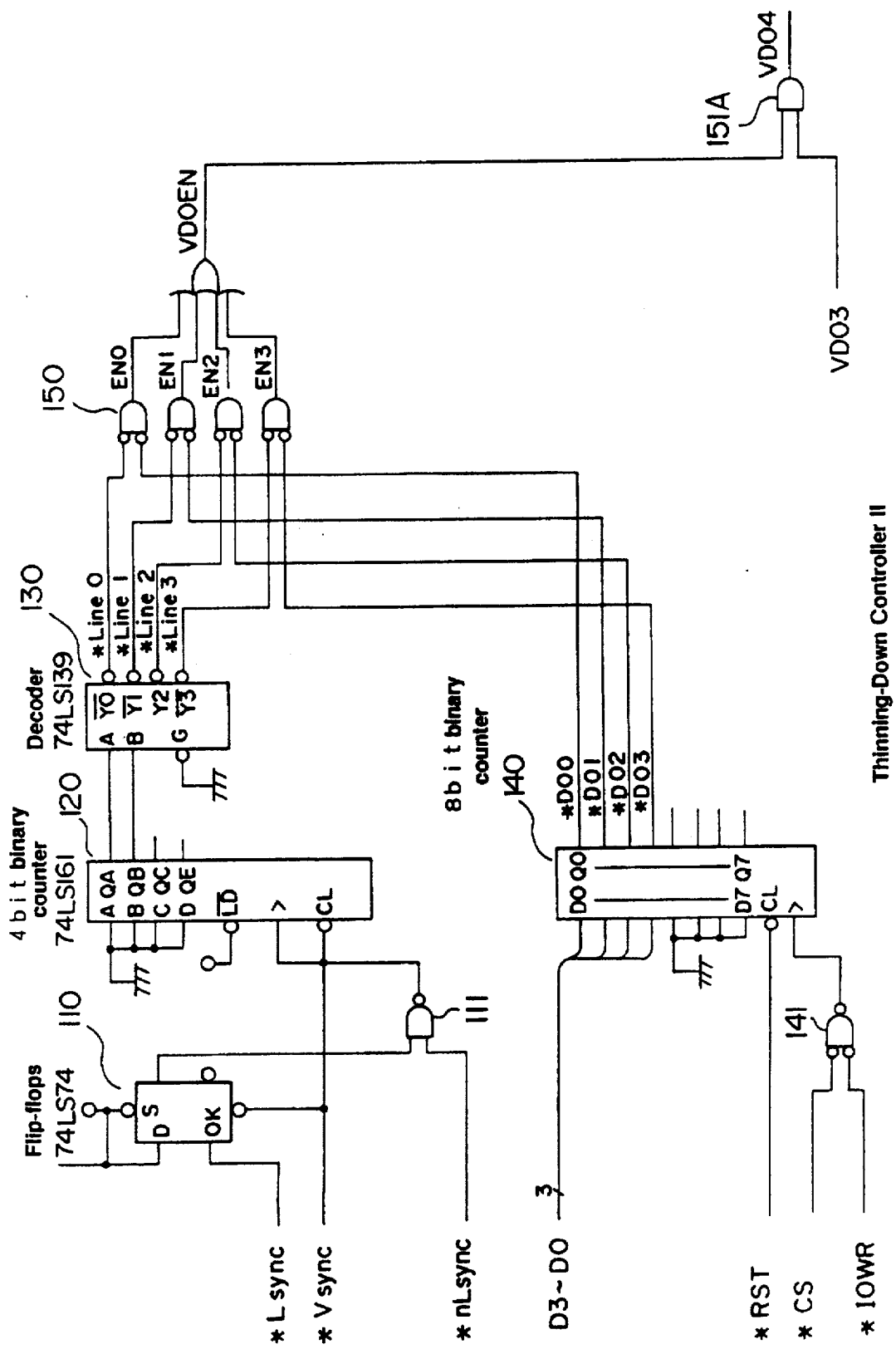
FIG. 18 is a circuit diagram showing a thinning-down controller II shown in FIG. 16.
Figure 19:
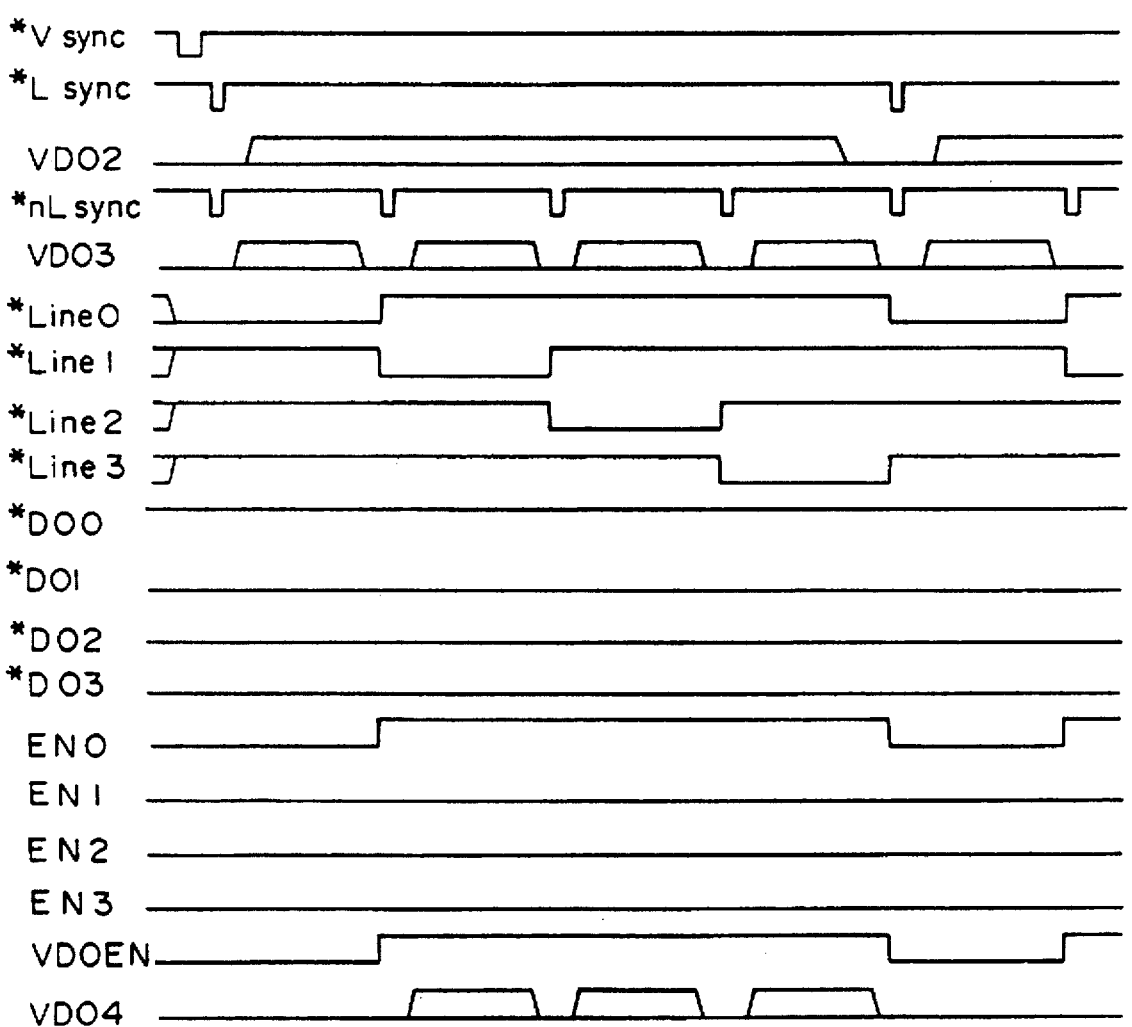
FIG. 19 is a timing chart for describing a control method in one-fourth division exposure control.

FIG. 18 is a circuit diagram showing the unit element thinning-down controller II 100. The operation of this circuit will now be described with reference to the time chart of shown in FIG. 19.

Reference numeral 110 designates flip-flops, which is initialized by a forefront signal (i.e., vertical sync signal) VSYNC to supply output signal to a NAND gate 111 whenever horizontal sync signal LSYNC is outputted.

Reference numeral 120 is 4-bit binary counter for counting divided scan lines. The counter 120 is initialized by paper forefront signal VSYNC for up-counting according to an output signal from the NAND gate 111, i.e., divided scan line number signal NLSYNC.

Up-count data from the counter 120 is inputted to a decoder 130 to provide a signal LINE-0, LINE-1, LINE-2 or LINE-3 representing the present divided scan line number.

Reference numeral 140 designates a register constituted by an 8-bit binary counter. The register 140 receives pixel edge detection mode signals D0 to D3 from the mode setting register 65 (see FIG. 10), which selects the pixel edge detection modes D0 to D3 shown in FIG. 11, and generates unit element edge detection mode signals D00 to D03 corresponding to the respective pixel edge detection modes D0 to D3.

The signals LINE-0, LINE-1,LINE-2 and LINE-3 representing the respective divided scan line numbers, from the decoder 130, and the mode signals D00 to D03 written in the register, are ANDed in inverter AND gates 150, whereby a video enable signal VDOEN is provided. The video enable signal VDEON and reconstituted unit element data VDO3 from the unit element processor 15 are ANDed in an AND gate 151A to generate thinned-down unit element video data VDO4, which is supplied through the parallel data output circuit 19 to the LED head 11.

What is claimed is:

1. An image forming method, in which video data is supplied through a thinning-down controller for thinning-down control to an engine for forming a dot image of reduced toner consumption, comprising the steps of:

bit thinning down the video data in units of scan lines;

dividing the bit thinned-down video data for each scan line unit into a plurality of unit elements in the main scanning line and/or the auxiliary scanning line and reconstituting the unit elements thus obtained through an image smoothing process or a pseudo image density increasing process by making adequate signal inversion;

bit thinning down the reconstituted unit elements in units of unit element lines; and supplying the unit element thinned-down reconstituted unit elements to the engine.

2. An image forming method, in which video data is supplied through a thinning-down controller for thinning-down control to an engine for forming a dot image of reduced toner consumption, comprising the steps of:

bit thinning down the video data in units of scanning lines by sending out non-modified bit signals corresponding to bit level change positions;

dividing the thinning-down controlled video data for each scan line unit into a plurality of unit elements in the main scanning direction and/or the auxiliary scanning direction;

reconstituting the unit elements thus obtained through an image processing process or a pseudo image density increasing process by making adequate signal inversion;

bit thinning down the reconstitute unit elements in units of unit element lines; and supplying the unit element thinned-down reconstituted unit elements to the engine.

3. An image forming apparatus, in which video data is supplied through a toner consumption reduction thinning-down control circuit for thinning-down control to an engine for forming a dot image of reduced toner consumption, comprising:
- a thinning-down control circuit for bit thinning down the video data in units of scan lines;
- a unit element processing circuit for dividing the video data for each scan line unit into a plurality of unit elements in the main scanning direction and/or the auxiliary scanning direction and reconstituting the unit elements thus obtained through an image smoothing process or a pseudo image density increasing process by making adequate signal inversion; and
- a unit element thinning-down control circuit for bit thinning down the reconstituted unit elements in units of unit element lines.

4. An image forming apparatus, in which video data is supplied through a toner consumption reduction thinning-down circuit for thinning-down control to an engine for forming a dot image of reduced toner consumption, comprising:
- a thinning-down control circuit for bit thinning down the video data in units of scan lines by sending out non-modified bit signals corresponding to bit level change positions;
- a unit element processing circuit for dividing the video data for each scan line unit into a plurality of unit elements in the main scanning direction and/or the auxiliary scanning direction and reconstituting the unit elements thus obtained through an image smoothing process or a pseudo image density increasing process by making adequate signal inversion; and
- a unit element thinning-down control circuit for bit thinning down the reconstituted unit elements in units of unit element lines.

* * * * *